B. J. CAMPBELL.
TELEMETER.
APPLICATION FILED MAR. 31, 1916.
1,246,230.
Patented Nov. 13, 1917.
2 SHEETS—SHEET 1.
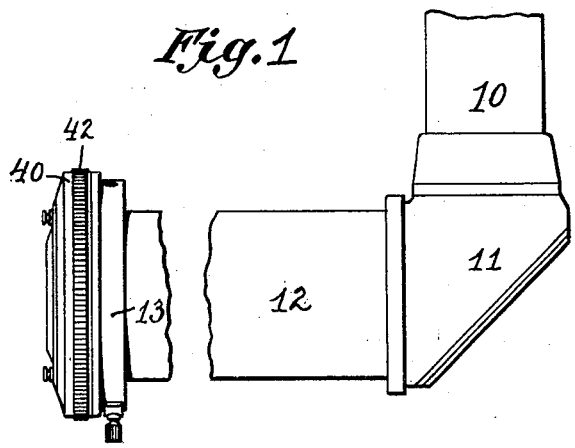
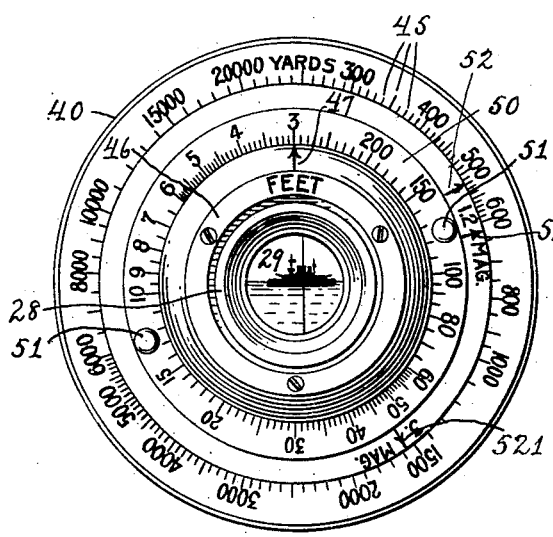
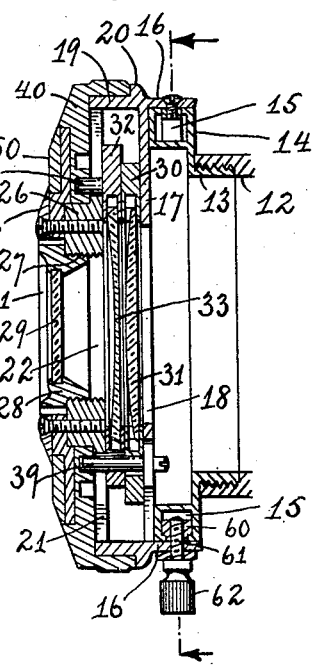
Ben J. Campbell, Inventor:
by William R. Baird
his Att'y B. J. CAMPBELL.
TELEMETER.
APPLICATION FILED MAR. 31, 1916.
1,246,230.
Patented Nov. 13, 1917.
2 SHEETS—SHEET 2.
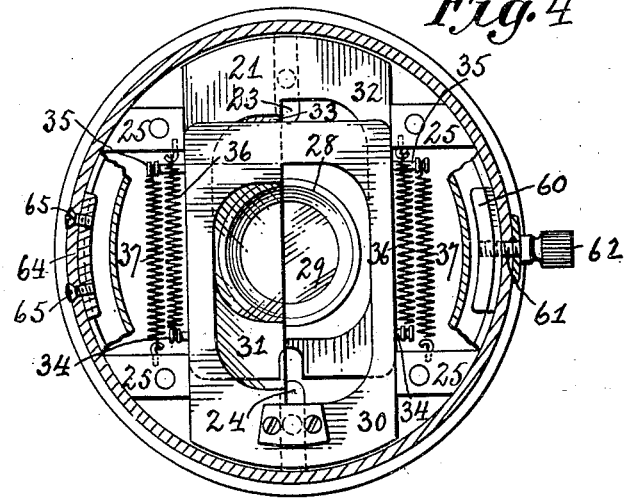
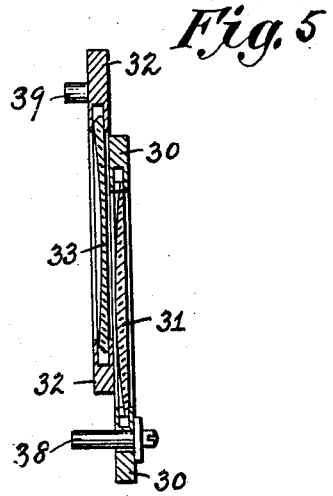
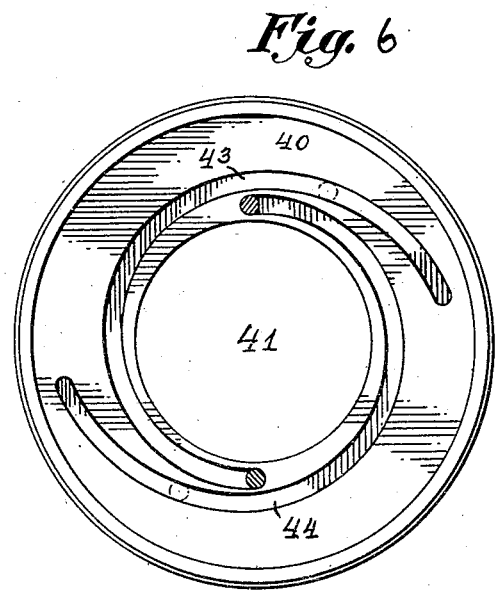
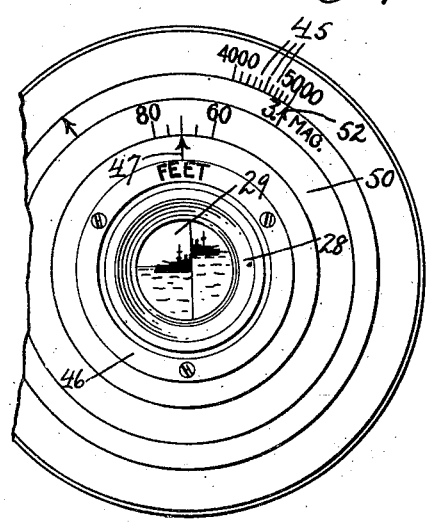
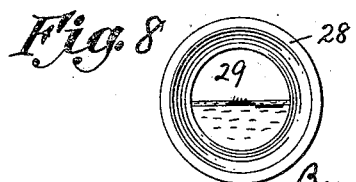
Ben J. Campbell, Inventor:
by William R. Baird
his Atty

UNITED STATES PATENT OFFICE.

BEN J. CAMPBELL, OF HOBOKEN, NEW JERSEY, ASSIGNOR TO KEUFFEL & ESSER COMPANY, OF HOBOKEN, NEW JERSEY, A CORPORATION OF NEW JERSEY.

TELEMETER.

1,246,230.     Specification of Letters Patent.     Patented Nov. 13, 1917.

Application filed March 31, 1916. Serial No. 87,909.

*To all whom it may concern:*

Be it known that I, BEN J. CAMPBELL, a citizen of the United States, residing at Hoboken, in the county of Hudson and State of New Jersey, have invented certain new and useful Improvements in Telemeters, of which the following is a specification.

This invention relates to a telemeter, or range finding optical device, whereby the distance of an object from an observer is automatically ascertained and readily read whenever a dimension of the object viewed through the device is known or can be assumed with sufficient accuracy.

In the drawings, in which there is illustrated a preferred form of the device embodying the invention, Figure 1 is a side elevation of the device on a small scale shown attached to the lower or observing end of a periscope; Fig. 2 is a front elevation of the device on a large scale; Fig. 3 is a transverse section of the same; Fig. 4 is a rear elevation, showing the lens frames; Fig. 5 is a transverse section through the lenses; Fig. 6 is a rear view of the range dial showing its spiral cam grooves; Fig. 7 is a front view of the device (with most of the graduations omitted) illustrating the use of the device when the known dimension of the object is vertical; and Fig. 8 is a similar view, but of the field of vision only illustrating the use of the device when the known dimension of the object is horizontal.

In the drawings, the upright tube of the periscope is represented at 10, the casing inclosing its usual optical reflecting element at 11, and its horizontal eye-piece tube at 12. Threaded into the tube 12 is a supporting ring 13, provided with an outwardly extending annular flange 14, having an annular groove indicated at 15, and carried by this ring is an annular support having a flange 16 adapted to encircle the grooved annular flange 14, an inwardly projecting diaphragm indicated at 17 with a central aperture 18, and having an outwardly projecting flange 19 with a peripheral fin or rib 20 between the two flanges 16 and 19.

Arranged within this support is a lens carrier consisting of a disk 21 having a central aperture 22, two slots diametrically arranged and indicated at 23 and 24 respectively, and provided at the rear of the disk with guide lugs indicated at 25 and at the front of the disk with an annular hub 26 internally threaded at 27 to receive the window frame 28, having the glass 29.

30 is a frame inclosing for not quite half of its width a plano-convex cylindrical lens, 31 and 32 is a similar frame inclosing for not quite half of its width a plano-concave cylindrical lens 33. These frames fit accurately between the guide lugs 25 and are superimposed one upon the other and adapted to slide with respect to each other between such guide lugs. The frame 30 is provided with projecting pins 34, 34 and the frame 32 is provided with similar projecting pins 35, 35. The pins 34 are connected to hooks on the opposite pair of lugs 25 by coiled springs 36, 36, and the pins 35 are similarly connected to the opposite pair of lugs 25 by coiled springs 37, 37. The function of these springs is to put a tension upon the lens frames when they are moved so as to prevent vibration of the frames and insure their stoppage with certainty at any point in their line of travel. Projecting toward the front of the device from the frame 30 is a pin 38 and similarly projecting from the lens frame 32 is a pin 39, the purpose of which will presently appear.

Arranged at the front of the device, is a range disk 40 having a central aperture 41, a peripheral knurled flange 42 and at its rear surface provided with two spiral cam grooves 43 and 44 starting and terminating in two concentric circles at diametrically opposite points. On its face, this disk has a series of edge graduations indicated at 45 and expressing successive linear distances as in terms of yards.

Arranged around and concentric with the central aperture 41 of the disk 40 and secured to or made integral with the hub 26 of the disk, is an index ring 46 provided with an arrow 47 or some similar indicating point displayed on its face.

Arranged in a recess in the face of the disk 40 intermediate the graduations 45 and the ring 46, is a dimension scale ring 50, provided with means, as outwardly projecting knobs 51, 51 by which it may be rotated, and which ring 50 is also graduated in terms of linear measurement, as feet. At the outer edge of this ring are one or more index indications 52, 52 corresponding to varying magnifications in the periscope or other optical instrument with which the device is to be used.

When the device is assembled as shown in Fig. 3, the pins 38 and 39 project forward and engage the cam grooves, and when the range disk 40 is rotated by means of the knurled flange at its periphery, the lens frames are moved and consequently the lenses are moved with respect to each other in a vertical direction.

It may sometimes be desirable to move such lens frames in a different direction, for instance a horizontal one, and means are provided for that purpose. This comprises a shoe 60 adapted to fit in the annular groove 15. Coöperating with this shoe is a clamp comprising a threaded shank 61 and a thumb piece 62. The threaded shank is adapted to pass through a hole in the flange 16 and to engage the shoe 60. The support for the lenses with the lenses themselves can be circularly moved with respect to the supporting ring 13 by loosening the clamp 61 so as to permit the annular support to circularly slide around the ring 13. By this means a circular adjustment of the lenses as a whole is readily effected, and when the lens system has been brought to a proper position, for instance, the horizontal, the tightening of the clamp against the shoe will hold the annular support firmly in place after such adjustment. This circular movement is facilitated by means of a segment guide 64 secured to the ring by means of screws 65.

The positions of the index points 52, 52 on the ring 50 must be determined either by calculation or previous experiment and must be as numerous as the different varieties of optical instrument with which the telemeter is to be employed.

In using the device, if the instrument is used alone and without a telescope or a periscope, the object whose range is to be measured is viewed through the window 29. The vertical edges of the cylindrical lenses apparently divide the field of vision into two unequal parts (see Fig. 2), but the object viewed through the glass is not distorted. Supposing that the distance from the water line to the top of the stack of the central smoke stack of the vessel shown in the drawing is known or can be more or less accurately estimated, the ring 50 by means of knobs 51 is rotated until the indicating point 47 on the ring 46 is opposite that graduation on the ring 50 corresponding to such vertical dimension. By means of the knurled surface of the range disk 40, the latter is rotated until the separation of the lenses and the amount of the deviation of the image of the object is such that one of its extremities coincides with the other extremity as originally viewed in the field of vision. This movement is illustrated in Fig. 7, where the rotation of the ring and consequent engagements of the pins 38 and 39 with the cam grooves 43 and 44 has moved the image of the vessel so that the water line is in a horizontal line with the top of the smoke stack as viewed in the unchanged part of the field. When the rotation of the range disk has ceased, the notation on its edge opposite the indicating point 52 will give the range in yards without any calculation or further estimation on the part of the observer. This result is secured from the fact that the cam grooves 43 and 44 are logarithmic spiral curves converting the uniform motion of the lenses relative to each other into logarithmic angular motion, the spiral cam grooves being cut in accordance with the equation in polar coördinates of the logarithmic spiral.

If the instrument is used in connection with an instrument having an optical magnification, as for instance a telescope or periscope, such magnification is denoted on the ring 50 by index points 520 and 521. In such case, after the lenses have been moved a distance corresponding with the known lineal dimension of the object viewed, the range is indicated by the graduation on the range disk opposite the index on the ring 50 corresponding to the particular magnification of the kind of optical instrument employed.

If no known vertical dimension of the object viewed is available, but a horizontal dimension is known or can be more accurately estimated, by means of the shoe 60 and clamp 61, the lens carrier is rotated through a quadrant so that the lenses are relatively moved in a horizontal instead of a vertical line. The operation of the instrument will then shift the image of the object viewed through the lens horizontally. For instance, suppose that the length of a ship as seen through the window (see Fig. 8) is two hundred feet; if the linear index is rotated then to 200 and the lenses shifted by rotating the range disk so that the image of the ship as viewed through the lenses is moved to the right until the prow of the lens image of the boat corresponds with the stern of the boat as viewed otherwise than through the lenses, then the range is read directly from the notation on the range disk as before either in accordance with the index 52, 520 or 521, according to whether an optical instrument is interposed between the telemeter and the object viewed or not.

I claim:

1. A telemeter comprising a lens carrier, a pair of lens elements, one plus and one minus, slidably mounted therein, to move relatively to each other rectilineally, and means for causing such movement, comprising a circularly movable member provided with two spiral logarithmic cams and a connection between each lens element and one of the cams whereby the relative movement of the lens elements caused by the rotation of the circular member is measured in terms of lineal measurement by the extent of such rotation.

2. In a telemeter, the combination with means for creating a field of vision, of cooperating lens elements covering a portion of said field of vision and both movable rectilineally and transversely of each other, means for moving both lens elements in opposite directions, and means for indicating in terms of distance the relative movement of the lens elements.

3. In a telemeter, means for creating a field of vision of a distant object, means covering a portion only of the field of vision for causing a predetermined deviation of such portion, and distance indicating means surrounding the field of vision and movable with the deviation causing means.

4. A telemeter comprising two lens elements adapted to be slidably moved with respect to each other, means for guiding and limiting such movement, and means for promoting such movement at a uniform rate including a rotating member provided with two logarithmic spiral cam grooves and an operating element for each lens element, said elements being respectively engaged with the different grooves.

5. In a device of the character described, two lens elements, one plus and one minus, adapted to be moved in opposite directions in the same line from a neutral point, means for causing such movement comprising a pin secured to or made integral with each lens element, means for restraining the pins against lateral movement, and means for causing their movement in a straight line comprising cams circularly rotatable and adapted to be engaged by said pins.

6. In a device of the character described, a pair of lens elements, one plus, one minus, axially superposed, logarithmic spiral means for transversely moving the lens elements relative to each other, a logarithmic range scale rotating with said spiral means, index means whereby the range is indicated.

7. In a telemeter, means for creating a field of vision of a distant object, means for causing an angular deviation of a portion of the field of vision, distance indicating means surrounding the field of vision, movable with the deviation causing means, and indexing means coöperating with the distance indicating means whereby target distance is directly indicated in terms of lineal distance.

8. In a telemeter, the combination with means for creating a field of vision, of means for distorting a portion of the same, comprising coacting lens elements, range indicating means including a logarithmic scale and a logarithmically arranged set of indicators, and means including a logarithmic cam curve for proportionately and correspondingly operating the lens elements and the range indicating means to properly divide the range and directly indicate it for various magnifications.

9. In a telemeter, the combination with means for creating a field of vision, of means for distorting a portion of the same, comprising coacting lens elements operating across a portion of the said field of vision, range indicating means including a logarithmic scale and a logarithmically arranged set of indicators, and means surrounding the field of vision, including a logarithmic cam curve for proportionately and correspondingly operating the lens elements and the range indicating means to properly divide the range and directly indicate it for various magnifications.

In testimony whereof I affix my signature in presence of two witnesses.

BEN J. CAMPBELL.

Witnesses:
CARL W. KEUFFEL,
BOWDEWNIE B. VAN SICKLE.

Copies of this patent may be obtained for five cents each, by addressing the "Commissioner of Patents, Washington, D. C."